United States Patent
Sato

(10) Patent No.: US 8,265,170 B2
(45) Date of Patent: *Sep. 11, 2012

(54) DATA TRANSMISSION SYSTEM, AND ITS TRANSMISSION SIDE APPARATUS AND RECEPTION SIDE APPARATUS

(75) Inventor: Tsutomu Sato, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/096,776

(22) Filed: Apr. 28, 2011

(65) Prior Publication Data

US 2011/0200122 A1    Aug. 18, 2011

Related U.S. Application Data

(63) Continuation of application No. 11/371,009, filed on Mar. 9, 2006, now Pat. No. 7,965,777.

(30) Foreign Application Priority Data

Mar. 29, 2005 (JP) .................................. 2005-095490
Mar. 2, 2006 (JP) .................................. 2006-056520

(51) Int. Cl.
    *H04N 7/12*    (2006.01)
(52) U.S. Cl. ........... 375/240.26; 375/240.02; 375/240.1; 375/240.12; 375/240.15; 375/240.24
(58) Field of Classification Search ............... 375/240.1, 375/240.12, 240.16, 240.26
    See application file for complete search history.

(56) References Cited

U.S. PATENT DOCUMENTS

| 6,256,449 | B1 | 7/2001 | Eto |
| 6,980,731 | B1 | 12/2005 | Tahara et al. |
| 7,016,598 | B2 * | 3/2006 | Tabuchi et al. ................ 386/281 |
| 7,792,152 | B1 | 9/2010 | Xu et al. |
| 7,792,413 | B2 * | 9/2010 | Van Gestel et al. ........... 386/240 |
| 7,852,405 | B1 * | 12/2010 | Yeh ............................... 348/445 |

(Continued)

FOREIGN PATENT DOCUMENTS

CN    1592144 A    3/2005

(Continued)

OTHER PUBLICATIONS

Notice of Reasons for Rejection mailed May 12, 2009 in corresponding Japanese Patent Application No. 2006-056530 (3 pages) and English translation (3 pages).

(Continued)

*Primary Examiner* — Hirdepal Singh
(74) *Attorney, Agent, or Firm* — Finnegan, Henderson, Farabow, Garrett & Dunner, L.L.P.

(57) ABSTRACT

A transmission side apparatus selectively inserts video stream data and MPEG data into a video storage area to store video stream data in a frame structure of an SDI system and generates SDI data of which the identification ID indicating a type of data included therein by an SDI data insertion processing device and transmits the SDI data to a coaxial cable from a transmission interface device. A reception side apparatus receives the SDI data transmitted via the coaxial cable by a reception interface device, extracts data to be transmitted from a video storage area of received SDI data and determines whether the data to be transmitted is the video stream data or the MPEG data by an SDI data extraction processing device to output it. Therefore, a high-speed MPEG data transmission assuring frame/field accuracy becomes possible by using an existing technology and device.

1 Claim, 4 Drawing Sheets

U.S. PATENT DOCUMENTS

| | | | |
|---|---|---|---|
| 7,853,124 B2 | 12/2010 | Ramaswamy et al. | |
| 7,859,956 B2* | 12/2010 | Shibata et al. | 369/47.1 |
| 7,864,722 B2 | 1/2011 | Yi et al. | |
| 7,986,846 B2* | 7/2011 | Seo et al. | 382/233 |
| 2002/0164149 A1 | 11/2002 | Wilkinson | |
| 2003/0237098 A1 | 12/2003 | Yamaguchi et al. | |
| 2004/0156505 A1 | 8/2004 | Yanagita | |
| 2006/0203675 A1* | 9/2006 | Tomura et al. | 369/59.11 |
| 2008/0285649 A1* | 11/2008 | Keesen | 375/240.16 |
| 2009/0252231 A1 | 10/2009 | Tahara et al. | |

FOREIGN PATENT DOCUMENTS

| | | |
|---|---|---|
| CN | 1501653 A | 6/2005 |
| JP | 62-237893 | 10/1987 |
| JP | 8-18914 | 1/1996 |
| JP | 2000-307971 | 11/2000 |
| JP | 2000-341654 | 12/2000 |
| JP | 2001-119694 | 4/2001 |
| JP | 2001-217719 | 8/2001 |
| JP | 2002-369219 | 12/2002 |
| JP | 2004-166059 | 6/2004 |

OTHER PUBLICATIONS

Combined Search and Examination Report issued by the British Patent Office on Jun. 21, 2006, for British Patent Application No. GB0604889.6.

Notification of Second Office Action mailed Aug. 14, 2009 in corresponding Chinese Patent Application No. 2006100054766.3 (6 pages) and English translation (7 pages).

* cited by examiner

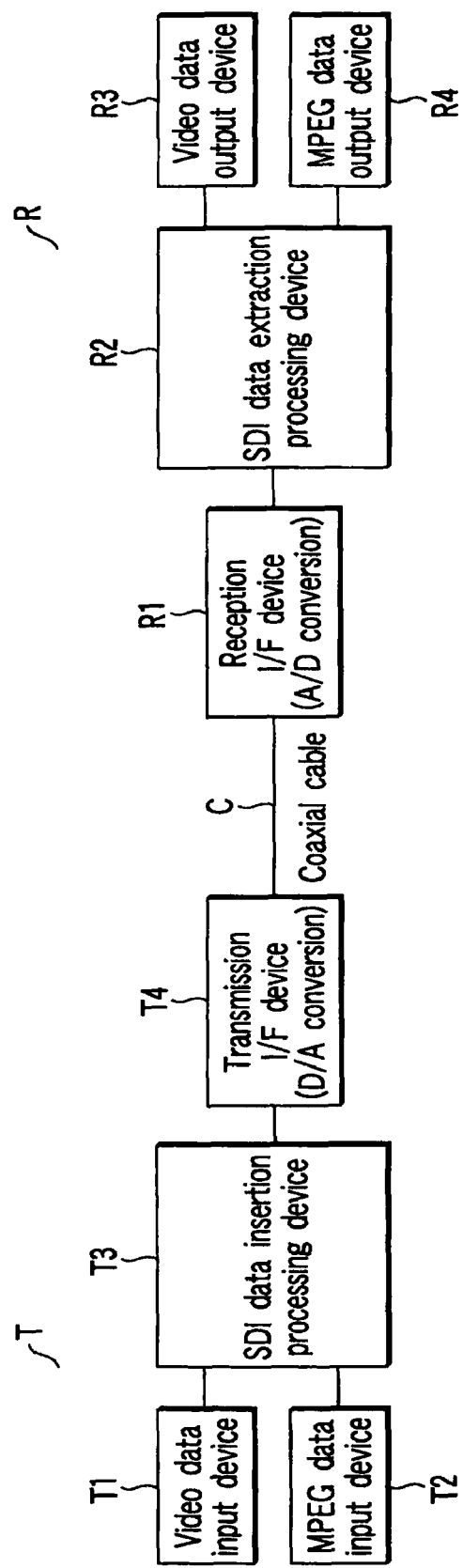
F I G. 1

DATA TRANSMISSION SYSTEM, AND ITS TRANSMISSION SIDE APPARATUS AND RECEPTION SIDE APPARATUS

CROSS-REFERENCE TO RELATED APPLICATIONS

This is a continuation of application Ser. No. 11/371,009, filed Mar. 9, 2006 now U.S. Pat. No. 7,965,777 (allowed), and claims the benefit of priority from prior Japanese Patent Application No. 2005-095490, filed Mar. 29, 2005; and No. 2006-056520, filed Mar. 2, 2006, all of which are incorporated herein by reference.

BACKGROUND OF THE INVENTION

1. Field of the Invention

The present invention relates to a data transmission system which enables a data transmission with frame/field accuracy in, such as a video processing system.

2. Description of the Related Art

Usually, a video processing system treating video stream data requires operational accuracy with the frame/field accuracy and conforms to a serial digital interface (SDI: SMPTE-259M specification in Japan) system or a high-definition (HD)-SDI (SMPTE-292M specification in Japan). On the other hand, owing to the development in a data compression transfer technology, a transmission system of the video stream data like moving picture exports group (MPEG) data in a data compression state has been widely used.

However, it is hard for a conventional and general data communication method to communicate with assured time accuracy and need a specific apparatus for communicating with the assured time accuracy. As a result, problems that necessary data may cause delay and that an increase in costs coming from securing a specific communication route and from introducing its specific communicating apparatus have occurred.

For example, when transmitting the MPEG data, the data communication method frequently transmits it by a TCP/IP system, but this TCP/IP system cannot assure the time accuracy of communication and has to be provided with a buffer on a reception side to solve the delay problem. As a result, the TCP/IP system delays time and complicates management.

The conventional data transmission method and its apparatus relating to the present invention are described in Jpn. Pat. Appln. KOKAI Publication No. 2004-166059 and Jpn. Pat. Appln. KOKAI Publication No. 2002-369219.

BRIEF SUMMARY OF THE INVENTION

An object of the present invention is to provide a data transmission system, and its transmission side apparatus and reception side apparatus which enable a high-speed data transmission with frame/field accuracy by using an existing technology and an apparatus.

The data transmission system regarding the present invention, selectively transmitting information data in addition to video stream data between apparatuses which employ an SDI system or an HD-SDI system to transmit the video stream data via a transmission path, comprises a transmission side apparatus provided with a data insertion means for selectively inserting the information data into a video storage area to store the video stream data in a frame structure of the SDI system or HD-SDI system to generate SDI data and with a transmission means for transmitting the SDI data to the transmission path; and a reception side apparatus provided with a reception means for receiving the SDI data transmitted via the transmission path and with a data extraction means for extracting data to be transmitted from the video storage area of the SDI data and determining whether the data to be transmitted is the video stream data or the information data to selectively switch and output it.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exemplary view showing a system configuration of a data transmission system employing an DSI system regarding the present invention;

DETAILED DESCRIPTION OF THE INVENTION

Figure 2:
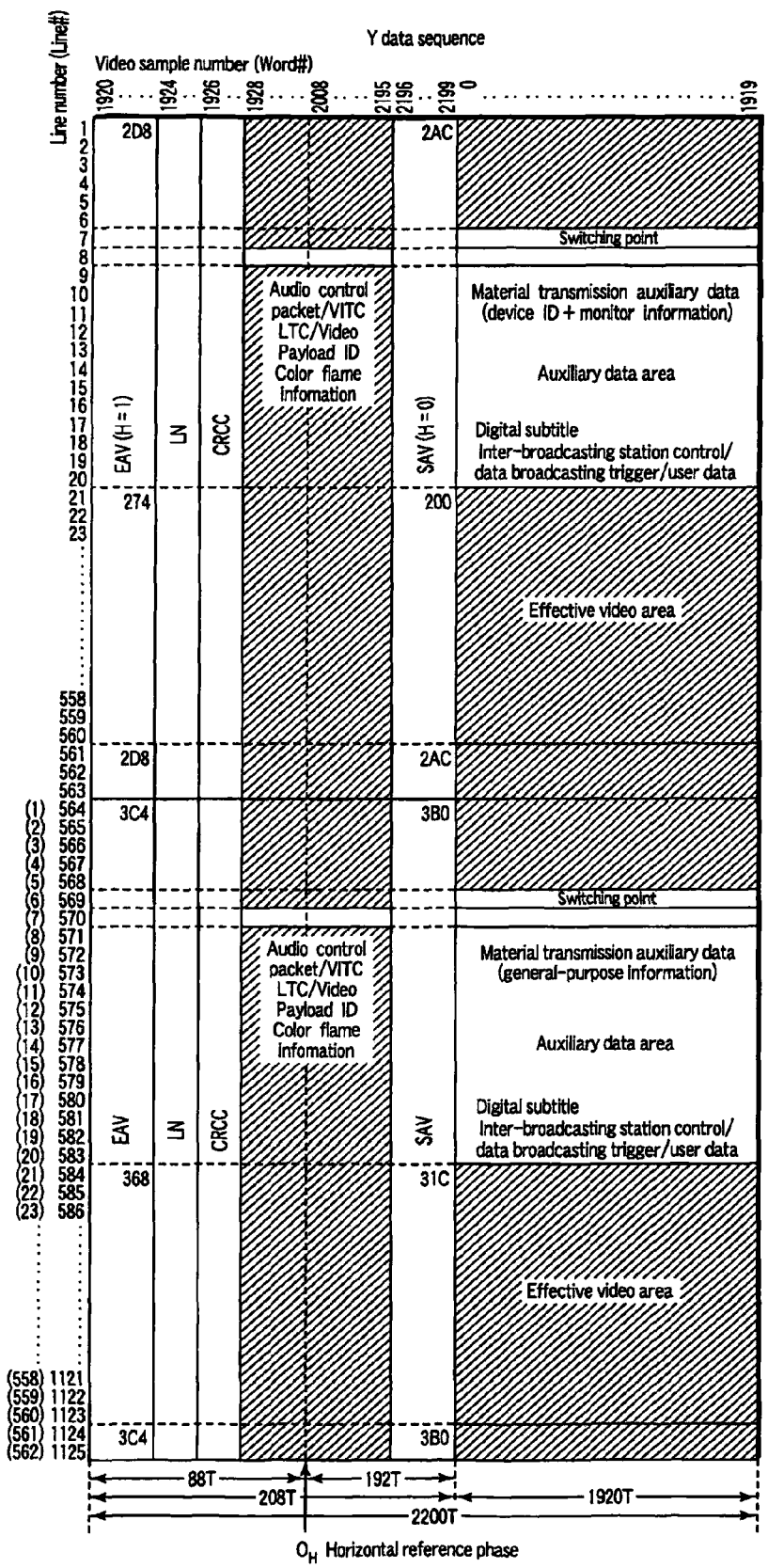
FIG. 2 is an exemplary view showing a structure of a transmission format of a transmission frame by a HD-SDI system.

Hereinafter, embodiments of the present invention will be described by referring to the drawings in detail.

As mentioned above, usually, since the video processing system treating the video stream data requires operational accuracy with frame/field accuracy, it employs the SDI system or HD-SDI system (hereinafter, referred to as SDI system). Between such existing video processing systems, for example, when MPEG data is required to be transmitted with the frame/field accuracy, they conventionally employ a method for decoding the MPEG data for a while to transmit it in the transmission format in the SDI system in a stream state. Or they employ a method for preparing another communication line in a TCP/IP system to assure delay times on both systems and transmitting the MPEG data. Since the former needs decode processing in transmission, there exists the problem that an image is deteriorated, and since the latter assures another communication line, there exists the problem that a cost is raised. Therefore, the present invention is featured by focusing a format structure defining the transmission frame in the SDI system and by posing data to be transmitted as image stream data.

FIG. 1 is the exemplary view showing the system configuration of the data transmission system employing the DSI system regarding the present invention. A transmission side apparatus T has a video data input device T1 to input video stream data (hereinafter, referred to as video data) and an MPEG data input device T2 to input information data such as MPEG data (hereinafter, generally referred to as MPEG data). Each input data of the input devices T1 and T2 is transmitted to an SDI data insertion processing device T3 and inserted into an SDI transmission frame together with video/MPEG identification information. A transmission interface (I/F) device T4 including a D/A conversion converts SDI data acquired in such a way into an analogue signal to transmit it via a coaxial cable C.

On the other hand, in a reception side apparatus R, a reception I/F device R1 including an A/D conversion takes in the SDI data in the analog signal from the coaxial cable C to convert it into a digital signal to input it to an SDI data extraction processing device R2. The processing device R2 extracts the video/MPEG identification information and the transmission data from the transmission frame of the input SDI data, when the identification information is the video data, outputs the extracted data to a video data output device R3, and when the identification information is the MPEG data, outputs the extracted data to an MPEG data output device R4.

Hereinafter, a structure of a transmission format of the transmission frame of the SDI data will be described in brief with reference to FIG. 2. FIG. 2 shows the structure of the transmission format by the SDI system (however, only Y data sequence). This HD-SDI transmission format transmits information of 10-bit×2 at 74 MHz and includes an auxiliary area of 0 to 1,919 words which are put on from the 9th line to the 20th line and from the 571st to 583rd line, and includes an effective video area (payload) from 0 to 1,919 words which are put on from the 21st line to the 560th line and from the 584th line to the 1,123rd line. Usually, the effective video area puts the video data in the effective video area, however, in this HD-SDI transmission format, the effective video area puts on MPEG data of 8-bit×2 to treat the MPEG data as the video data. With treating the MPEG data to be transmitted as the video data as like this manner, the data transmission system can achieve a data transmission with a speed higher than 1 G bps.

Here, as for a first specific example to transmit the MPEG data, the HD-SDI transmission format inserts a packet including an identification ID indicating that the MPEG data is put in the effective video area into the auxiliary data area and puts the MPEG data in the effective video area. As for a second specific example, the HD-SDI transmission format does not insert any packet into the auxiliary data area but inserts a packet including an identification to indicate that the transmission data is the MPEG data into a head part of the effective video area and puts the MPEG data in the succeeding effective video area. In both examples, before receiving the MPEG data, the reception side apparatus can determine, by the identification ID packet, that the MPEG data but not the video data is put in the effective video area, so that it can easily switch the subsequent processing in accordance with a type of data.

Each higher order 2-bit is fixed to "01" so as not to affect on a conventional SDI video data transmission (so as to avoid an inhibit word in video data). By assuming a state where a line situation is extremely bad, the specific examples intend to improve reliability of the data by using Read Solomon correction codes and the like.

Figure 3:
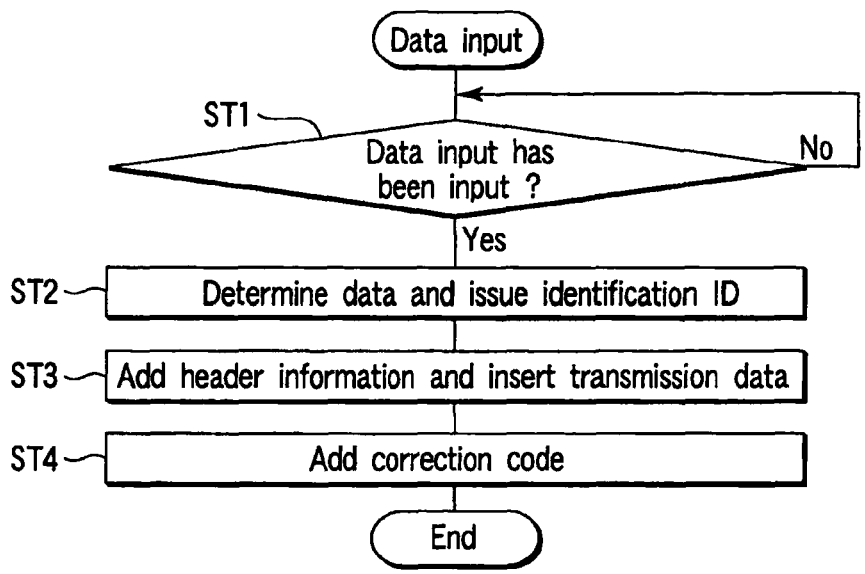
FIG. 3 is an exemplary flowchart showing a flow of concrete processing of an SDI data insertion processing apparatus using the transmission format of the HD-SDI system.

FIG. 3 is the flowchart showing the flow of the concrete processing of the SDI data insertion processing device T3 using the transmission format of the HD-SDI system. At first, the processing device T3 monitors an existence of a data input (step ST1) and in the case of existence thereof, determines whether the data input is the video data or the MPEG data and issues the identification ID on the basis of the determination result to insert it into a header of the transmission data (step ST2). Next to this, the processing device T3 inserts the header into a head of a payload (effective video area) for video data transmission and then inserts the input transmission data by turns (step ST4). At last, the processing device T3 outputs the transmission data as the SDI data by adding an error correction code thereto (step ST5).

Figure 4:
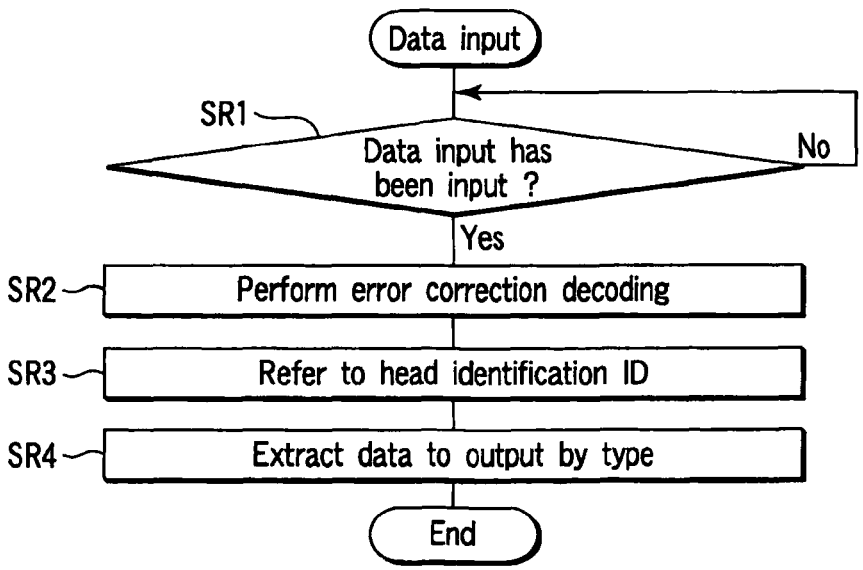
FIG. 4 is an exemplary flowchart showing a flow of concrete processing of an SDI data extraction processing apparatus using the transmission format of the HD-SDI system.

FIG. 4 is a flowchart showing a flow of concrete processing of the processing device R2 corresponding to the processing device T3. At first, the processing device R2 monitors an input of the SDI data (step SR1), and in the case of an existence of a data input, it conducts error correction decoding processing (step SR2) the determines whether the following data is the video data or MPEG data by reading out the identification ID from the header positioned at the head of the payload for the image data transmission in the HD-SDI format (step SR3). And the processing device R2 classifies the transmission data to output the transmission data to the video data output device R3 and to the MPEG data output device R4, respectively (step SR4).

According to the above-mentioned configuration, the data transmission system employs the SDI system enabling the high-speed transmission of the video data and can selectively transmit the video data and MPEG data by a payload for a video data transmission of the transmission format of the SDI transmission frame while notifying whether the transmission data is the video data or MPEG data in accordance with the identification ID.

Figure 5:
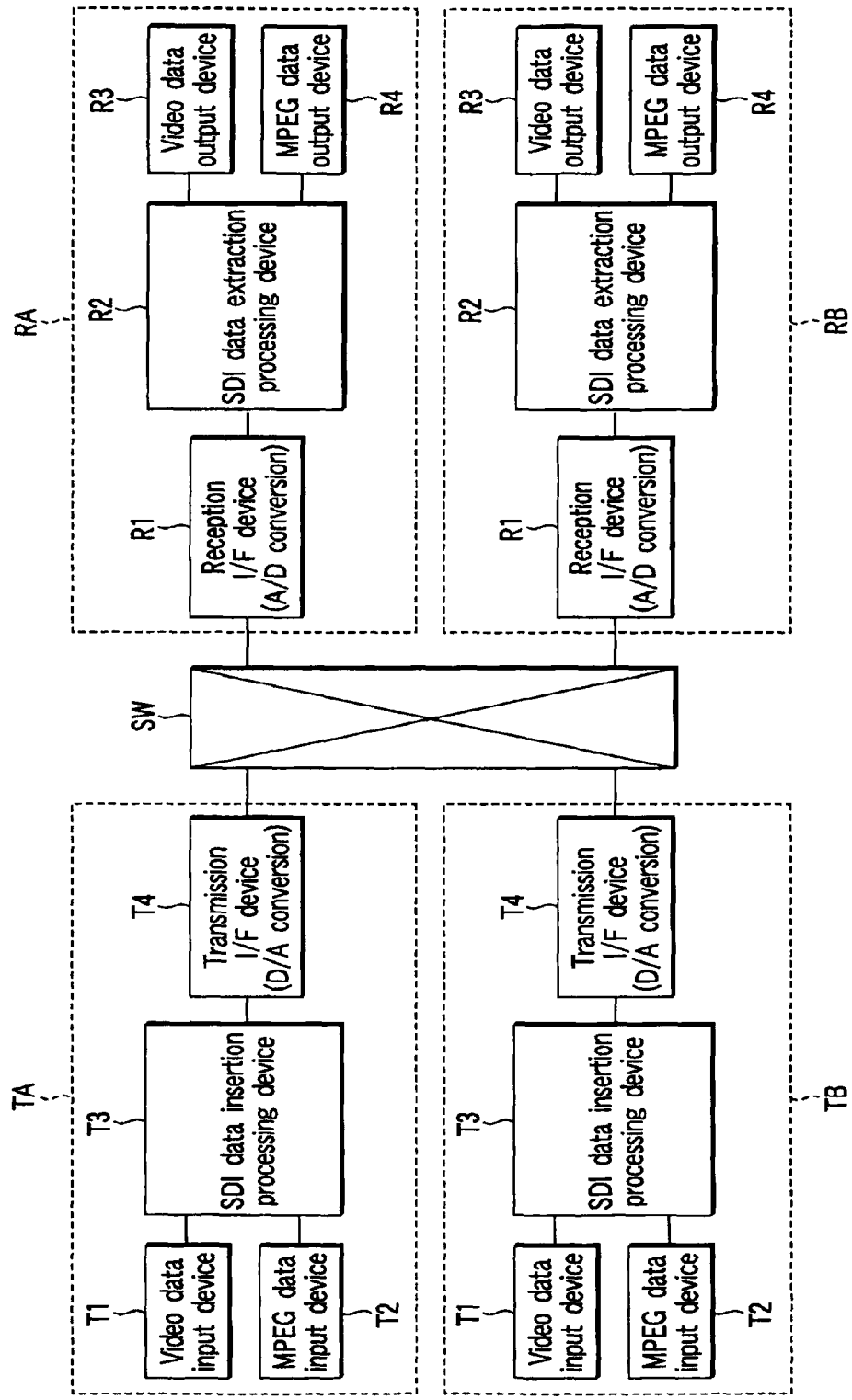
FIG. 5 is an exemplary block diagram showing a system configuration selectively switching to control input two lines and output two lines as an operation example of the present invention.

FIG. 5 is the block diagram showing the system configuration selectively switching to control the input two lines and output two lines as the operation example of the present invention. In FIG. 5, each apparatus TA and TB corresponds to the transmission side apparatus T sown in FIG. 1, and each apparatus RA and RB corresponds to the reception side apparatus R shown in FIG. 1. A line matrix device SW selectively switches and controls output systems of the transmission side apparatuses TA and TB to input systems of the reception side devices RA and RB.

This system configuration uses devices being employed in a system to treat general videos, except for SDI data insertion devices of the transmission side apparatuses TA and TB and SDI data extraction devices of the reception side apparatuses RA and RB. And the system configuration achieves a data transmission though an arbitrary path switching to control by means of the matrix device SW.

As described above, according to the present invention, in systems requiring field accuracy and using the SDI system, from a system treating videos down, an easy and high-speed data transmission which utilizes an existing SDI system as it is and does not need a specific communication system or a buffer to maintain a communication can be realized.

Having described the case of the transmission of the MPEG data in the aforementioned embodiment, the present invention is not limited by the types of the data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmission side apparatus for use in a data transmission system, selectively transmitting information data in addition to video stream data between apparatuses which employ an SDI (serial digital interface) system or an HD (high definition)-SDI system to transmit the video stream data via a transmission path, comprising:
- a data insertion unit to insert selectively the information data into a video storage area to store video stream' data in a frame structure of the SDI system or HD-SDI system therein to generate SDI data; and
- a transmission unit to transmit the SDI data to the transmission path,
- wherein the data insertion unit generates identification information indicating whether the data to be transmitted is the video stream data or the information data other than the video data and, when storing the data to be transmitted in the video storage area, stores the identification information in an auxiliary data area prepared independently from the video storage area,
- wherein the data transmission system comprises the transmission side apparatus and a reception side apparatus provided with a reception unit to receive the SDI data transmitted via the transmission path and with a data extraction unit to extract data to be transmitted from the video storage area of the SDI data and to determine whether the data to be transmitted is the video stream data or the information data to selectively switch and output it,
- wherein the data extraction unit determines a type of the data to be transmitted from the identification information in the auxiliary data area when extracting the data to be transmitted from the video storage area of the auxiliary data area.

* * * * *

UNITED STATES PATENT AND TRADEMARK OFFICE
CERTIFICATE OF CORRECTION

| | | |
|---|---|---|
| PATENT NO. | : 8,265,170 B2 | Page 1 of 1 |
| APPLICATION NO. | : 13/096776 | |
| DATED | : September 11, 2012 | |
| INVENTOR(S) | : Sato | |

It is certified that error appears in the above-identified patent and that said Letters Patent is hereby corrected as shown below:

Claim 1, column 5, line 5, change "stream' data" to --stream data--.

Signed and Sealed this
Twenty-seventh Day of November, 2012

David J. Kappos
*Director of the United States Patent and Trademark Office*